United States Patent [19]

Kawai et al.

[11] Patent Number: 4,483,699

[45] Date of Patent: Nov. 20, 1984

[54] METHOD FOR PRODUCING GLASS FIBERS WITH CENTRIFUGAL FORCE

[75] Inventors: Kyosuke Kawai, Kanagawa; Mitsuru Nakagawa, Tokyo; Shinji Yanase; Kiyoshi Kawai, both of Kanagawa, all of Japan

[73] Assignee: Japan Inorganic Material Co., Ltd., Kanagawa, Japan

[21] Appl. No.: 474,348

[22] Filed: Mar. 11, 1983

[30] Foreign Application Priority Data

Mar. 17, 1982 [JP] Japan .................................. 57-42080

[51] Int. Cl.³ ............................................. C03B 37/05
[52] U.S. Cl. ................................................ 65/8; 65/15
[58] Field of Search ............................. 65/6, 8, 14, 15; 106/99

[56] References Cited

U.S. PATENT DOCUMENTS

| | | | |
|---|---|---|---|
| 2,192,944 | 3/1940 | Thomas | 65/16 X |
| 3,238,029 | 3/1966 | Cullen | 65/15 |
| 3,533,769 | 10/1970 | Baier et al. | 65/14 X |
| 3,542,533 | 11/1970 | Hesse | 65/15 |
| 3,607,165 | 9/1971 | Guthrie | 65/14 |
| 4,090,883 | 5/1978 | Rauschenfels | 106/99 |

Primary Examiner—Robert Lindsay
Attorney, Agent, or Firm—Wenderoth, Lind & Ponack

[57] ABSTRACT

A method for producing glass fibers with centrifugal force, comprising melting raw materials for the production of glass fibers in a melting furnace, flowing-down the molten glass from a nozzle at the bottom of the furnace so as to let the molten glass fall onto grooves coated with a glass layer, the grooves being engraved around the total peripheral part of a rotary disc provided below the melting furnace and rotating at a high speed, and simultaneously discharging a combustion gas from a ring burner provided above the inner part of the rotary disc radially to the surroundings of the rotary disc so as to control and maintain the grooves to a prescribed temperature; and an apparatus therefor. The molten glass falling onto the grooves is elongated fibrously by radially spouting the molten glass to the surroundings of the rotary disc with the aid of centrifugal effect due to the rotation of the disc, and thus the production of glass fibers can be done satisfactorily.

5 Claims, 11 Drawing Figures

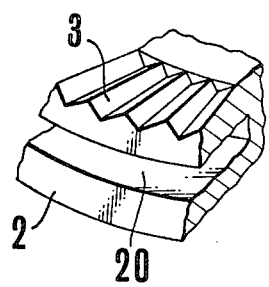
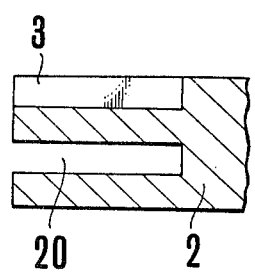
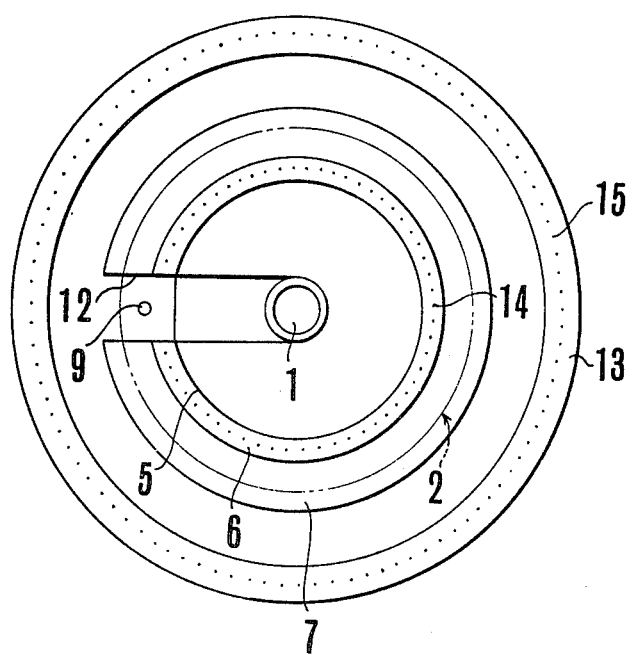

METHOD FOR PRODUCING GLASS FIBERS WITH CENTRIFUGAL FORCE

BACKGROUND OF THE INVENTION

The present invention relates to a method for producing glass fibers (fibrous glass wool) with centrifugal force and an apparatus therefor.

The method for producing glass fibers with centrifugal force is generally to supply a molten glass flow or stream to a rotating body, which is supported on a vertical shaft, and to radially spout the molten glass from the periphery thereof by the centrifugal force so as to divide and elongate or attenuate the glass into fibers.

The glass flow elongated in this way is flowed downwards in the vicinity of the outer circumference of the rotary body, usually coated with a binder, and then collected on the surface of a porous collecting conveyer provided below the rotary body. A suction chamber is provided usually below the collecting conveyer for forming the glass into a mat, blanket or other form. The cotton-like product thus formed is finally subjected to such treatments as forming, hardening, processing and packing with the use of an aftertreatment apparatus to produce a final product.

Now, as a rotary body, a cylindrical cage-type hollow body having a plurality of orifices with a diameter of 0.2 to 1.2 mm in a multi-stage manner around the total peripheral wall thereof has usually been adopted. In order to avoid violent erosion and deformation of the hollow body, the quality of the glass composition to be applied should have an appropriate viscosity-temperature characteristic so that the melt passes through the orifices easily at a prescribed low temperature range. For example, in the case of a low-alkaline glass fiber material, a large quantity of such compounds as compounds of barium, boron and fluorine has usually been added as a flux for the purpose of lowering the melting and spinning temperatures. However, the compounds of boron and fluorine are usually volatile at the temperature of melting and spinning, so that an excess of them must be added in consideration of the volatilization loss. Thus, the production cost becomes high, and particularly, since fluorine compounds cause public pollution, a particular exhaust gas treating apparatus is needed. Barium compounds are not only costly but also erode the furnace refractories violently.

Furthermore, in a conventional cylindrical cage-type rotary body, the inner surface of the outer peripheral wall and the orifices are always at a temperature above 1200° C. in contact with molten glass. At this temperature a usual heat resistant steel has inferior durability, and therefore Ni—Cr—Co type super heat resisting steel or a noble metal such as platinum must be employed. These metals are not only difficult to work, but are also costly.

SUMMARY OF THE INVENTION

Under such circumstances, the object of the present invention is to offer a method and apparatus for producing glass fibers which overcome the technical difficulties as mentioned above and with no need of elevating the temperature of the rotary body itself.

Another object of the invention is to produce glass fibers having heat resistivity from materials with a high softening point, which has hitherto been considered difficult, by restricting the addition of precious volatile fluxes.

Accordingly, the essential points of the present inventive method comprise flowing-down a molten glass stream onto grooves coated with a glass layer radially engraved on the total peripheral part of a rotary disc, maintaining the grooves at a predetermined temperature, whereby elongated molten glass fibers are obtained by spouting the molten glass in a radial direction from the rotary disc with centrifugal force of the rotary disc.

Secondly, the essential points of the present inventive apparatus for producing glass fibers with centrifugal force comprise a rotary disc provided below a melting furnace for raw materials for the production of glass fibers having a flowing-down nozzle at the bottom thereof, said rotary disc having radially engraved grooves on the total peripheral part thereof, driving means for rotating the disc, and a ring burner for jetting combustion gas radially onto the circumference of the rotary disc.

In a conventional apparatus, for instance with the use of a cage-type hollow rotary body, the limit of heat resisitve temperature of the glass fibers produced is about 400° C., or about 480° C. when the quality of the product is excellent. In contrast to this, the present invention is particularly effective to produce glass fibers having a high softening temperature with no need of elevating the temperature of the rotary body itself, so that the heat resistivity of the glass fibers produced can be elevated to nearly about 800° C. The present invention is also effective to divide into fibers a low temperature softening material and an inorganic material which becomes plastic at higher temperatures.

BRIEF DESCRIPTION OF THE DRAWINGS

FIGS. 3(a)–(e) are enlarged drawings showing the grooves at the peripheral part of the rotary disc.

FIG. 4 is a plane drawing showing the lower side of the main burner body.

DETAILED DESCRIPTION OF THE PREFERRED EMBODIMENTS

The preferred embodiments of the present invention will be described in the following with reference to the drawings.

Figure 1A:
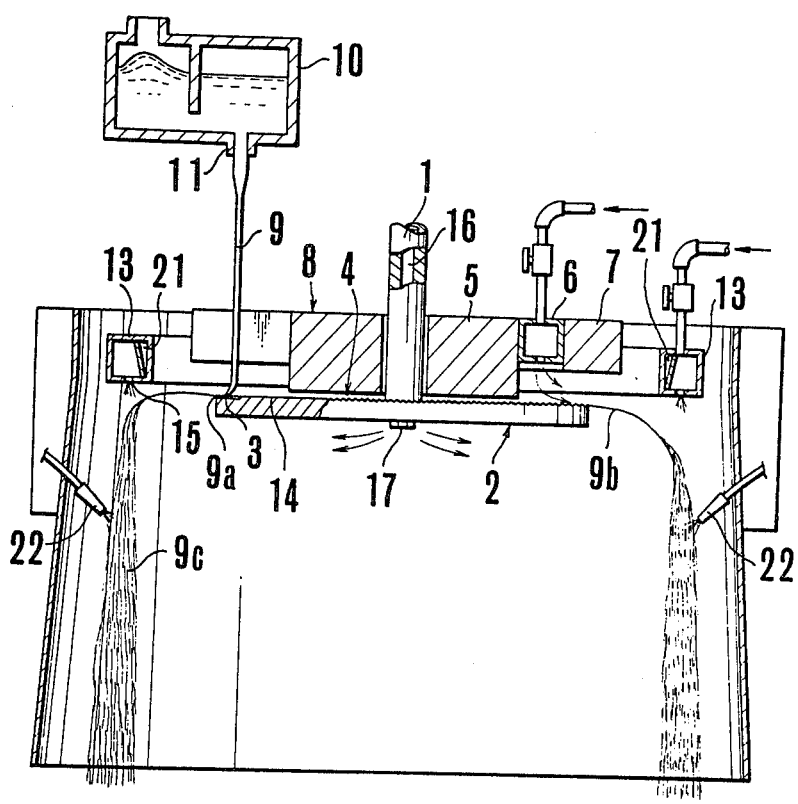
FIG. 1(a) is an explanatory drawing showing the partially broken longitudinal section of an example of the present apparatus for producing glass fibers.

FIGS. 1(a) and (b) show the outline of the construction of an example of the apparatus for producing glass fibers.

Figure 1B:
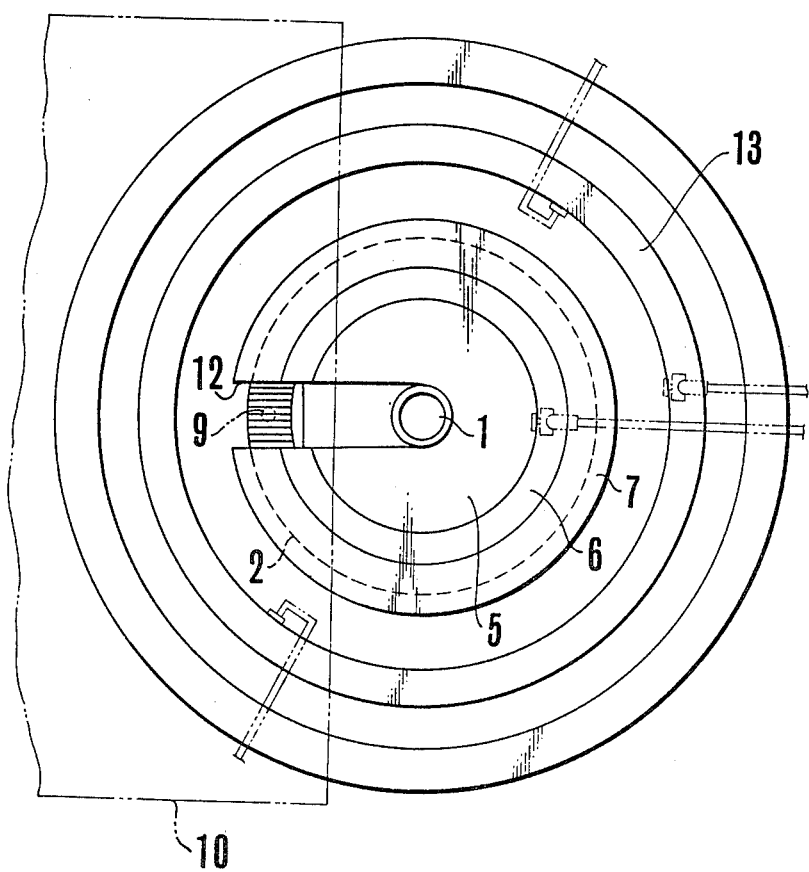
FIG. 1(b) is a plane drawing thereof.

In FIG. 1, 2 is a rotary disc supported on a vertical shaft 1, and which comprises a flat plate with a thickness of 5 to 25 mm and a diameter of 300 to 500 mm and rotatable with a speed of more than 3,000 revolutions per minute or desirably 4,500 to 8,000 revolutions per minute (the rotary disc may be somewhat inclined).

Figure 2:
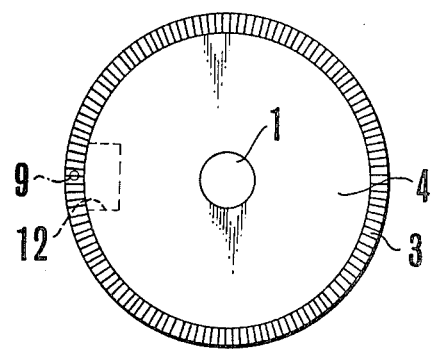
FIG. 2 is a plane drawing of the upper surface of the rotary disc.
Figure 3A:
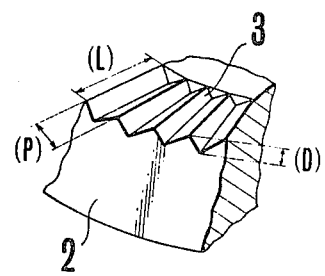
Figure 3B:
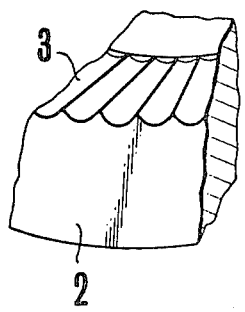
Figure 3C:
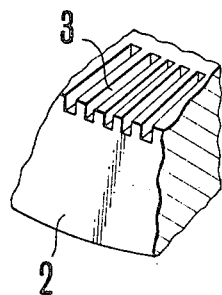

As shown in FIG. 2, grooves 3 with a length (L) of 5 to 25 mm, a pitch (P) of 0.5 to 2 mm and a depth (D) of 0.5 to 2 mm are provided radially around the entire peripheral part of the upper surface of the rotary disc 2. These grooves 3 divide a glass flow finely and into long streams. In the rotary disc 2, there is no need of providing such means as a cage-type hollow body as in a conventional apparatus, so that its construction is simple and its operation cost can greatly be reduced. As shown in FIGS. 3(a)–(e), the grooves may be V-, U- or ⊔-shaped in their section. What is important in this connection is that the adjacent grooves are separated with partition walls, and the V-shaped one is particularly suitable for driving the glass flow finely. The upper limits of the dimensions (L), (P) and (D) are determined experimentally from the knowledge that the diameter of the glass fibers produced becomes too large when these dimensions are larger than the above-mentioned limits.

The rotary disc comprises, as above described, a flat plane having grooves 3 around the total peripheral part thereof, but the rotary disc may be provided with a hollow portion 20 at its wall side (cf., FIGS. 3(d) and (e)). It is preferable that the hollow portion 20 has a height (H) of 2 to 10 mm and a width (W) of 5 to 25 mm. The heat conduction from the groove to the back side of the disc can be reduced, and the temperature in the vicinity of the grooves can easily be controlled. The fuel consumption of the ring burner 6 as will be described hereinafter can also economically be reduced. On the other hand, if the same quantity of fuel is consumed, the use of a disc having a hollow portion result in the formation of finer and superior quality glass fibers.

Above the rotary disc 2, a main burner body 8 comprising a shelter 5, a ring burner 6 and an outer peripheral wall 7 is provided in such a manner that the rotation of the rotary disc 2 together with the support shaft 1 is not hindered. The shelter 5 prevents the heat from the molten glas flow, the glass flow itself and the burner from damaging the central part 4 of the rotary disc 2 and the lower part of the support shaft 1. The ring burner 6 is provided for controlling and maintaining the grooves and their circumferences to a desired temperature by burning a fuel gas with air or oxygen. The outer peripheral wall 7 is provided for the purpose of forming a combustion chamber and a slit which facilitates the discharge of combustion gas and the projection of finely divided glass flow.

10 is a melting furnace for melting raw materials for producing glass fibers. It is designed so that molten glass 9 flowing down through a nozzle 11 is transferred through an inlet 12 provided at the main burner body 8 into the grooves 3 on the rotary disc where the molten glass is finely divided, and is projected outwards along the grooves due to the effect of centrifugal force and vitrified fibrously as elongated glass.

The elongated glass flow 9b is solidified due to a compressed air stream from nozzles 15 in a blast ring 13 and is guided downwards to form woolly glass fibers 9c. The glass fibers thus produced are coated, if necessary, with a binder such as resin and cement by using spray nozzles 22 as in a conventional way. It is advisable that the glass fibers produced are collected on a conveyer (not shown in the drawing) provided below the rotary disc.

In the conventional art, molten glass is flowed down usually from the central part of a cylindrical rotating body and distributed towards the peripheral wall thereof, but the heat loss is very large in such a system. In some instances, molten glass is flowed into a storage chamber provided inside of the peripheral wall. This process has merit in that the heat loss is not large, but it is necessary thereby that the temperature of the wall is always the same as the temperature of the molten glass flow. Therefore, in both instances, there is a problem that the rotary body must be made of a sufficient heat resistant material.

In contrast to this, one of the advantages of the present invention is, as already stated, that glass fibers having an elongated softening point can be obtained with no need of elevating the temperature of the rotary body itself. In the present invention, namely, it is sufficient to maintain the grooves of the rotary disc at a temperature in the range of about 400° to 500° C. lower than the temperature of the molten glass for producing elongated glass fibers easily, thus greatly improving the durability of the rotary disc.

The process for producing glass fibers by using the present apparatus will be described more in detail in the following.

Figure 5:
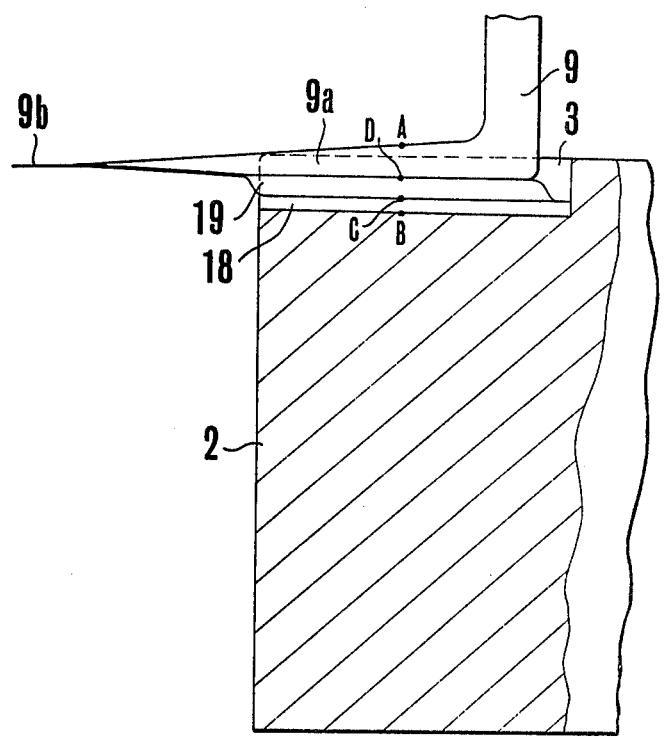
FIG. 5 is an explanatory drawing showing the states of molten glass flow and glass flow at the grooves.

The position where molten glass is flowed down on the rotary disc in an apparatus as shown in FIG. 1 is within 25 mm or desirably 3 to 10 mm from the periphery of the disc, and thus the heat loss can be reduced as far as possible until molten glass flow is elongated fibrously. The rotary disc 2 is operated in a state that only the peripheral part of the grooves 3 is heated, and it is sufficient that the temperature of this part is about 400° to 500° C. lower than the temperature of the molten glass flow, so that the consumption of heat necessary for making the glass fibers can beneficially be reduced very much. The reason why the rotary disc itself can be operated at a low temperature is as follows:

In the present invention as shown in FIG. 5, a hardly removable thin glassy coating layer 18 with a thickness of not more than 0.1 mm is formed on the upper surface of the grooves 3 (the details will be described hereinafter), and this coating layer serves very effectively as a heat insulating layer to prevent the cooling of the glass flow 9a. The coating layer 18 has, on the other hand, the effect of preventing overheating and oxidation of the rotary disc, so that the rotary disc itself is cooled from the lower side thereof and is not heated up to the temperature of the molten glass flow.

The above-mentioned glassy coating layer 18 may be formed on the upper surface of the rotary disc prior to the commencement of operation, or by the molten glass itself flowing on the grooves of the rotary disc maintained at a temperature as low as 400° to 500° C. at the initial stage of the operation. The quality of the glass for the coating layer may be the same as for the glass fibers, one with a higher softening temperature, but the one with the same composition is desirable for practical use.

When molten glass 9 is flowed down continuously into the glass-coated grooves 3 of the disc 2, rotating with a speed of not less than 3,000 r.p.m. and being maintained to a temperature about 400° to 500° C. lower than the temperature of the molten glass flow, a thermal boundary layer 19 is formed between the coating layer 18 and the glass flow 9a. It has been determined that this boundary layer 19 has a thickness of about 0.3 to 0.5 mm, a temperature between those of the coating layer 18 and the glass flow 9a, a high viscosity and a slow flowing speed. Therefore, it is considered that this boundary layer 19 gives an appropriate viscous resistance to the lower part of the glass flow 9a so as to prevent the glass flow 9a from radiating out of the disc in the form of droplets or a thin film state, and further, has an effect to promote the elongation of the glass fibrously as well as an effect as a heat insulating layer to the rotary disc.

When the glassy coating layer 18 is composed of the same composition as the molten glass flow 9, the coating layer 18, the boundary layer 19 and the glass flow 9a have the same composition. Therefore, even when the two layers are consumed due to the temporary overheating of the rotary disc, there is entirely no danger of contaminating the glass with foreign matters due to the peeling off of the coating layer as in the usual process, and the coating layer 18 and the boundary layer 19 can easily and beneficially be formed again by controlling the operation temperature to the normal condition even if the two layers are damaged.

Figure 6:
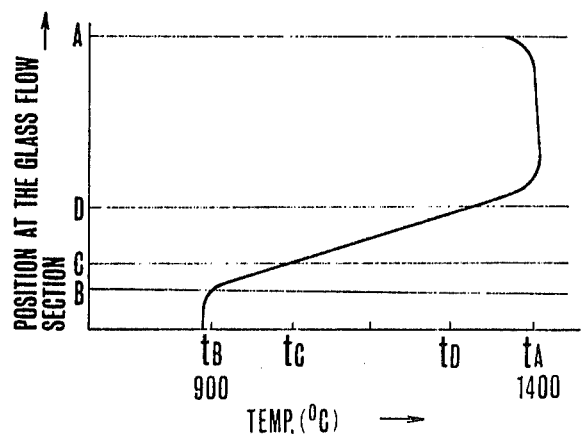
FIG. 6 is a graph showing the temperature distribution of the glass flow in FIG. 5.

FIGS. 5 and 6 show the construction of the grooves and the temperature distribution at the glass flow 9a, the boundary layer 19 and the coating layer 18. Even when the temperature of the grooves is about 400° to 500° C. lower than the temperature of the molten glass flow 9, the glass flow 9a shows an appropriate fluidity and can be elongated sufficiently. For instance, even when the temperature of the molten glass flow is 1500° C., the operation can be done smoothly with the temperature of the grooves 3 at not more than 1000° C. Therefore, such steels as usual stainless steels, heat resistant steels and, particularly, austenite steels containing 10 to 22% Ni and 16 to 26% Cr can sufficiently be used, thus reducing the production cost remarkably.

When the flowing-down point on the disc of the molten glass flow 9 exceeds 25 mm from the peripheral end of the disc, the glass fibers obtained become thicker than 12μ in their diameter and the rotary disc is apt to be corroded by oxidation and deformed due to the increase of the heating zone, so that such a condition is not desirable. The number of flowing-down points of the molten glass flow 9 can be determined optionally, but it is desirable that the number is one or two. When providing two flowing-down points, the flowing-down points may be placed at symmetrical positions on the rotating disc plane. When the number is two, all the periphery of the rotary disc can beneficially be utilized for the radial spouting of the glass flow, thus increasing the productivity. According to experiments, the productivity was about 60 to 120 kg/H in a usual spinning machine.

The temperature around the grooves 3 is controlled and maintained by the action of the ring burner 6. It is desirable that the position of the ring burner is practically 10 to 30 mm inside of the flowing-down point of the molten glass flow. The burner flames are discharged outwards due to the effect of centrifugal force in contact with the rotating disc, having an effect to accelerate the radial spouting of the glass flow 9a. The burner holes 14 are desirably designed so that the flames contact the plane of the rotating disc at an angle of 30° to 90° (perpendicular). The shelter 5 inhibits the central part 4 of the rotary disc and the support shaft 1 from being heated by the glass flow and the burner flames, and the gap between the shelter and the rotary disc is practically 3 to 10 mm, but the smaller the better.

The outer peripheral wall 7 outside of the ring burner 6 is provided so as to suitaby control the gap between the ring burner 6 and the rotary disc 2 for projecting the elongated glass flow and the burner flames outwards smoothly, and the gap is desirably 7 to 40 mm, particularly 10 to 30 mm.

The blast ring 13 is effective to guide the elongated glass flow 9b downwards stably and to accelerate the formation of the glass flow into fibers. In the apparatus of the present example, the position of the blast ring is 20 to 110 mm outside of the rotary disc and the distance between the blast holes 15 and the upper surface of the rotary disc is 5 to 50 mm so as to jet a high pressure gas of 0.5 to 10 kg/cm$^2$G (such as air and super heated steam), nearly perpendicularly to the elongated glass flow 9b.

It is desirable to provide the blast ring 13 at a position adjacent to the upper periphery of the rotary disc, but when the position is too near thereto, the elongated glass flow adheres to the blast ring 13 and the temperature in the vicinity of the rotary disc is lowered, causing difficulty in controlling the temperature of the grooves. In this connection, when a cooling portion 21 is provided in the blast ring 13 (by water or air cooling), this difficulty can be prevented. Due to the effect of the cooling portion 21, the super-heating of the surface of blast ring 13 and the adhesion of the elongated fine glass flow thereto can be prevented, and the blast ring 13 can be provided sufficiently close to the rotary disc 2. It is possible in this instance to lower the pressure and amount of jet stream and to produce glass fibers sufficiently at a low pressure.

The support shaft 1 is easily apt to be superheated due to the friction with the bearing and the heat conduction from the surroundings, so that the support shaft 1 is desirably cooled by circulating cooling water or air through a conduit 16 (cf. FIG. 1(a)). The application of cooling air is desirable because the superheating of the rotary disc can be prevented by blowing cooling air through distribution holes 17 provided at the lower part of the rotary disc. It is also possible to jet a binder such as a resin from the inner side of the glass wool produced by providing a spray nozzle 22 to the conduit 16 for coating the glass fibers uniformly.

The present method and apparatus described above can be applied for producing glass fibers from various kinds of glass fiber materials, for example, as will be described in the following.

A raw material for producing glass fibers can comprise 20% to 65%, preferably 30% to 56% CaO, and 75% to 30%, preferably 60% to 35% SiO$_2$ with the remainder being one or more constituents selected from the group consisting of 2% to 15% Al$_2$O$_3$, 0.1% to 1.5% Na$_2$O+K$_2$O, 0.5% to 15% MgO, 1.5% to 2.0% Fe$_2$O$_3$ etc. and having a high melting point is particularly suitable for making the glass fibrous. Short glass fibers obtained from such material have a heat resistance above 700° C., are excellent in the resistance against the alkalinity of cement and can sufficiently be formed even when the density of the product is low. There is entirely no drawback such that a formed body with a sufficient strength and heat insulating characteristic can only be obtained when the density is as high as 32 kg/m$^3$ or larger as in the cases of conventional asbestos, rock wool and slag wool. Formed products having a sufficient strength and excellent heat insulating characteristic can be produced from the fibers obtained by the present invention even when the density of the product is as low as about 4 to 20 kg/m$^3$.

EXAMPLES

By using the present apparatus as described above, glass fibers were produced by the process described in the following.

(1) Composition of the raw material for producing glass fibers (in weight parts) (Table 1).

TABLE 1

| Component | Example 1, 2 | 3 | 4 | 5 |
|---|---|---|---|---|
| $SiO_2$ | 72.8 | 61.6 | 37.8 | 39.5 |
| $Al_2O_3$ | 2.0 | 3.0 | 4.3 | 14.8 |
| $Na_2O, K_2O$ | 16.0 | 0.1 | 0.2 | 1.5 |
| CaO | 5.5 | 32.6 | 55.2 | 30.4 |
| MgO | 3.5 | 0.9 | 1.4 | 11.6 |
| $Fe_2O_3$ | 0.2 | 1.6 | 0.7 | 1.3 |
| BaO | — | — | — | — |
| $B_2O_3$ | — | — | — | — |

BaO and $B_2O_3$ *l are used for the purpose of clarifying that no flux is necessary for lowering the temperature of spinning the melt in the present invention.*

(2) Shape and size of the main parts of the apparatus:

(a) Rotary disc:
  Diameter 350 mm
  Thickness 12 mm
  Hollow portion no
  yes (Height (H) 4 mm and width (W) 10 mm as in FIG. 3(d))
  Rotation 5,000 r.p.m.
  Material Austenite-type stainless steel sheet SUS 310S (containing 24%–26% Cr and 19%–22% Ni)
(b) Grooves:
  Shape V-shaped in section (cf. FIG. 3(a))
  Size Length (L) 12 mm, Pitch (P) 1.6 mm, Depth (D) 1.4 mm
(c) Burner:
  Gap between its periphery and the upper surface of the rotary disc 20 mm
(d) Blast ring: (a cooling portion in the inside)
  Distance between the outer periphery of the rotary disc and the blast hole 40 mm
  Distance between the upper surface of the rotary disc and the blast ring 6 mm
(3) Operation conditions:
  (a) Flowing-down point of the molten glass flow:
    Three cases were studied with different distances from the peripheral end of the rotary disc, namely 3, 6 and 15 mm
  (b) Surface temperature of the grooves of the rotary disc: kept at a temperature 400° C. to 500° C. lower than that of the molten glass flow
  (c) Thickness of the coating layer: 0.06–0.1 mm (Produced at the commencement of the process)
  (d) Thickness of the boundary layer: 0.3–0.5 mm
(4) Results:

The results of the experiments carried out by the above-mentioned conditions (1)–(3) were as shown in Table 2.

As clearly shown in Table 2, it was proved that stainless steel can satisfactorily be used as a rotary disc by controlling the temperature of the rotary disc itself to 400° C. to 500° C. lower than that of the molten glass flow.

It was proved that, not only the glass fiber materials having a low softening point such as shown in the examples (1) and (2), but also high softening point materials as in the examples (3), (4) and (5), which conventionally gave only thick and short fibers poor in elasticity and heat insulating power, can satisfactorily be made into excellent glass fibers in the present invention. The present glass fibers can effectively be applied as heating insulating and acoustic absorption materials even when the density of the product is as low as not more than 20 $kg/m^3$.

TABLE 2

| | EXAMPLE | | | | | | | |
|---|---|---|---|---|---|---|---|---|
| | 1-(1) | 1(2) | 1-(3) | 2 | 3 | 4 | 5-(1) | 5-(2) |
| Temperature of molten glass flow (°C.) | 1400 | 1400 | 1400 | 1400 | 1440 | 1480 | 1520 | 1520 |
| Temperature of groove surface (°C.) | 900 | 950 | 950 | 1000 | 940 | 980 | 1020 | 1020 |
| Temperature difference | (500) | (450) | (450) | (400) | (500) | (500) | (500) | (500) |
| Propane gas consumed by burner (kg/H) | (13.0) | (15.0) | (12.0) | (16.5) | (13.2) | (17.0) | (17.3) | (15.1) |
| Hollow portion of rotary disc | (no) | (no) | (yes) | (no) | (yes) | (no) | (no) | (yes) |
| Glass fiber diameters in (μ) when the flowing-down point is (mm) {3 / 6 / 15} | 2.6 / 4.1 / 6.2 | 2.4 / 3.8 / 6.0 | 2.5 / 4.0 / 6.0 | 2.1 / 3.0 / 5.7 | 3.0 / 4.8 / 7.1 | 3.2 / 5.4 / 7.6 | 3.8 / 6.0 / 7.9 | 3.1 / 5.5 / 7.0 |
| Heat resistant temp. (°C.) | 400 | 400 | 400 | 400 | 780 | 800 | 750 | 750 |
| Durability of rotary disc (hr) | 2160 | 2015 | 2008 | 1968 | 2040 | 1920 | 1440 | 1510 |
| Results of cement alkali corrosion tests Weight variation after immersion (%)* | −5.9 | −5.3 | — | — | −0.03 | −0.05 | +0.03 | — |

*Glass fiber samples were immersed for 2.5 hours in a cement alkali solution having pH value of from 12 to 14 contained in a stainless steel beaker and heated in a boiling water. The solution was prepared by allowing a suspension of 1.0 kg of Portland cement in 3.5 l of water to stand for 24 hours and filtering the supernatant fluids.

What we claim:

1. A method for producing glass fibers by means of centrifugal force, comprising
   flowing-down a molten glass stream into grooves coated with a glass layer and being radially engraved on a peripheral portion of a flat rotating disc,
   maintaining the grooves at a temperature 400° to 500° C. lower than the temperature of the molten glass stream so as to form a thermal boundary layer between the glass coating layer and the glass flow along said grooves, and
   spouting the molten glass in a radial direction from the rotating disc by means of centrifugal force of the rotating disc to form elongated molten glass fibers.

2. A method according to claim 1, in which the glass coating layer is formed on the grooves by the molten glass stream flowing thereon.

3. A method according to claim 1, in which the disc has a diameter from 300 to 500 mm and is rotated at a speed from 3,000 to 8,000 r.p.m.

4. A method according to claim 1, in which the molten glass contains 20 to 65% CaO, and 75 to 30% $SiO_2$, the balance being one or more of $Al_2O_3$, $Na_2O$, $K_2O$, MgO, and $Fe_2O_3$.

5. A method according to claim 1, which further comprises solidifying the elongated molten glass fibers by an air blast.

* * * * *